United States Patent
Russell et al.

(10) Patent No.: US 9,210,733 B2
(45) Date of Patent: Dec. 8, 2015

(54) METHOD AND APPARATUS TO FACILITATE PAIRING BETWEEN WIRELESS DEVICES

(71) Applicant: Motorola Mobility LLC, Libertyville, IL (US)

(72) Inventors: Michael E Russell, Lake Zurich, IL (US); Amitkumar N Balar, Mundelein, IL (US); Amit Jain, Mundelein, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 142 days.

(21) Appl. No.: 13/875,620

(22) Filed: May 2, 2013

(65) Prior Publication Data

US 2014/0273845 A1   Sep. 18, 2014

Related U.S. Application Data

(60) Provisional application No. 61/785,534, filed on Mar. 14, 2013.

(51) Int. Cl.
```
H04B 7/00    (2006.01)
H04W 76/02   (2009.01)
H04W 4/00    (2009.01)
```
(Continued)

(52) U.S. Cl.
CPC ......... *H04W 76/023* (2013.01); *H04L 63/0869* (2013.01); *H04W 4/008* (2013.01); *H04W 8/005* (2013.01); *H04W 12/06* (2013.01)

(58) Field of Classification Search
CPC ............................ H04W 76/023; H04W 4/008
USPC ............. 455/41.1, 41.2, 41.3, 410; 340/10.51
See application file for complete search history.

(56) References Cited

U.S. PATENT DOCUMENTS 6,783,071 B2   8/2004  Levine et al.
7,831,207 B2 * 11/2010  Mercurio et al. ............ 455/41.2

(Continued)

FOREIGN PATENT DOCUMENTS

| EP | 1 995 914 A1 | 11/2008 |
| EP | 2 306 692 A1 | 4/2011 |
| JP | 2010288157 A | 12/2010 |

OTHER PUBLICATIONS

International Search Report and Written Opinion of International application No. PCT/US2014/015208, mailed May 23, 2014, 15 pp.

(Continued)

*Primary Examiner* — Wesley Kim
*Assistant Examiner* — Md Talukder
(74) *Attorney, Agent, or Firm* — Shumaker & Sieffert, P.A.

(57) ABSTRACT

A method and apparatus to facilitate pairing between a first wireless device and a second wireless device includes a pairing apparatus for determining (304) an address of the second wireless device and writing the address to the first wireless device to bypass an address discovery process between the first and second wireless devices. The pairing apparatus also initiates (312) removal of an input and output capability indication in at least one of the first wireless device or the second wireless device to control an association model type that is applied during a pairing process, between the first and second wireless devices, which uses the address of the second wireless device. The removal of the input and output capability indication is reversed (318) upon confirming (316) a successful pairing between the first and second wireless devices.

8 Claims, 5 Drawing Sheets

(51) Int. Cl.
*H04W 8/00* (2009.01)
*H04W 12/06* (2009.01)
*H04L 29/06* (2006.01)

(56) References Cited

U.S. PATENT DOCUMENTS

| | | | |
|---|---|---|---|
| 7,948,925 B2* | 5/2011 | Miyabayashi et al. | 370/302 |
| 8,565,676 B2* | 10/2013 | Gormley et al. | 455/41.1 |
| 8,762,715 B2* | 6/2014 | Camp et al. | 713/168 |
| 2005/0152294 A1* | 7/2005 | Yu et al. | 370/310 |
| 2007/0123166 A1* | 5/2007 | Sheynman et al. | 455/41.2 |
| 2007/0197164 A1 | 8/2007 | Sheynman et al. | |
| 2008/0144645 A1* | 6/2008 | Russell et al. | 370/412 |
| 2008/0150681 A1* | 6/2008 | Andersen | 340/5.8 |
| 2009/0111378 A1* | 4/2009 | Sheynman et al. | 455/41.1 |
| 2009/0286479 A1* | 11/2009 | Thoresson et al. | 455/41.3 |
| 2010/0203832 A1* | 8/2010 | Russell et al. | 455/41.2 |
| 2011/0081860 A1* | 4/2011 | Brown et al. | 455/41.3 |
| 2011/0117843 A1* | 5/2011 | Kim | 455/41.2 |
| 2011/0117845 A1* | 5/2011 | Kirsch et al. | 455/41.2 |
| 2011/0183612 A1* | 7/2011 | Bregman-Amitai et al. | 455/41.2 |
| 2011/0210831 A1* | 9/2011 | Talty et al. | 340/10.51 |
| 2011/0217950 A1* | 9/2011 | Kozlay | 455/410 |
| 2014/0273845 A1* | 9/2014 | Russell et al. | 455/41.2 |

OTHER PUBLICATIONS

Bluetooth SIG, Inc., "Bluetooth Specification Version 4.0: Architecture & Terminology Overview"; Jun. 30, 2010, pp. 1-140, vol. 1.

International Preliminary Report on Patentability from International Application No. PCT/US2014/015208, dated Sep. 24, 2015, 12 pp.

* cited by examiner

METHOD AND APPARATUS TO FACILITATE PAIRING BETWEEN WIRELESS DEVICES

FIELD OF THE DISCLOSURE

The present disclosure relates generally to wireless devices and more particularly to methods and apparatus to facilitate the pairing of wireless devices.

BACKGROUND

Miniaturization of electronic devices and advancements in battery technology encourage proliferation of wireless protocols, such as Bluetooth and ZigBee, for connecting electronic devices within personal area networks. Bluetooth, for example, is a protocol standard for short-range wireless connectivity between diverse types of devices, such as cellular phones, headsets, Internet-controlled thermostats and security systems, computer mice and keyboards, stereo speakers, baby monitors, and the like. It utilizes the unlicensed Industrial, Scientific and Medical (ISM) 2.4 GHz radio frequency band and a frequency-hopping spread spectrum (FHSS) method of transmission. Bluetooth has many applications, such as controlling devices where infrared technology was previously used, and represents an attractive means of communication because of its implemented security measures.

In any wireless setup, security is a concern because radio-wave transmissions can be intercepted. Some wireless protocols, such as Bluetooth, guard against this type of attack by limiting sensitive personal communications to trusted devices. A bond is established with a trusted device by sharing a private key that is used to encrypt transmissions. When bonding is completed, the paired devices can exchange data without asking permission.

The process of establishing a trusted pair comes with the price of being a potentially burdensome procedure, especially for a user who is not technically inclined. Additionally, it provides only limited security against particular types of attacks. One such attack is the man-in-the-middle attack, which occurs when a user wants to connect two wireless devices but unknowingly connects to a third (attacking) device. The third device is electronically transparent and eavesdrops on communications it relays back and forth between the compromised devices that share the illusion they are directly connected to one another. Additionally, the third device has the ability to pass its own data (e.g., commands) to the compromised devices and potentially cause damage.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
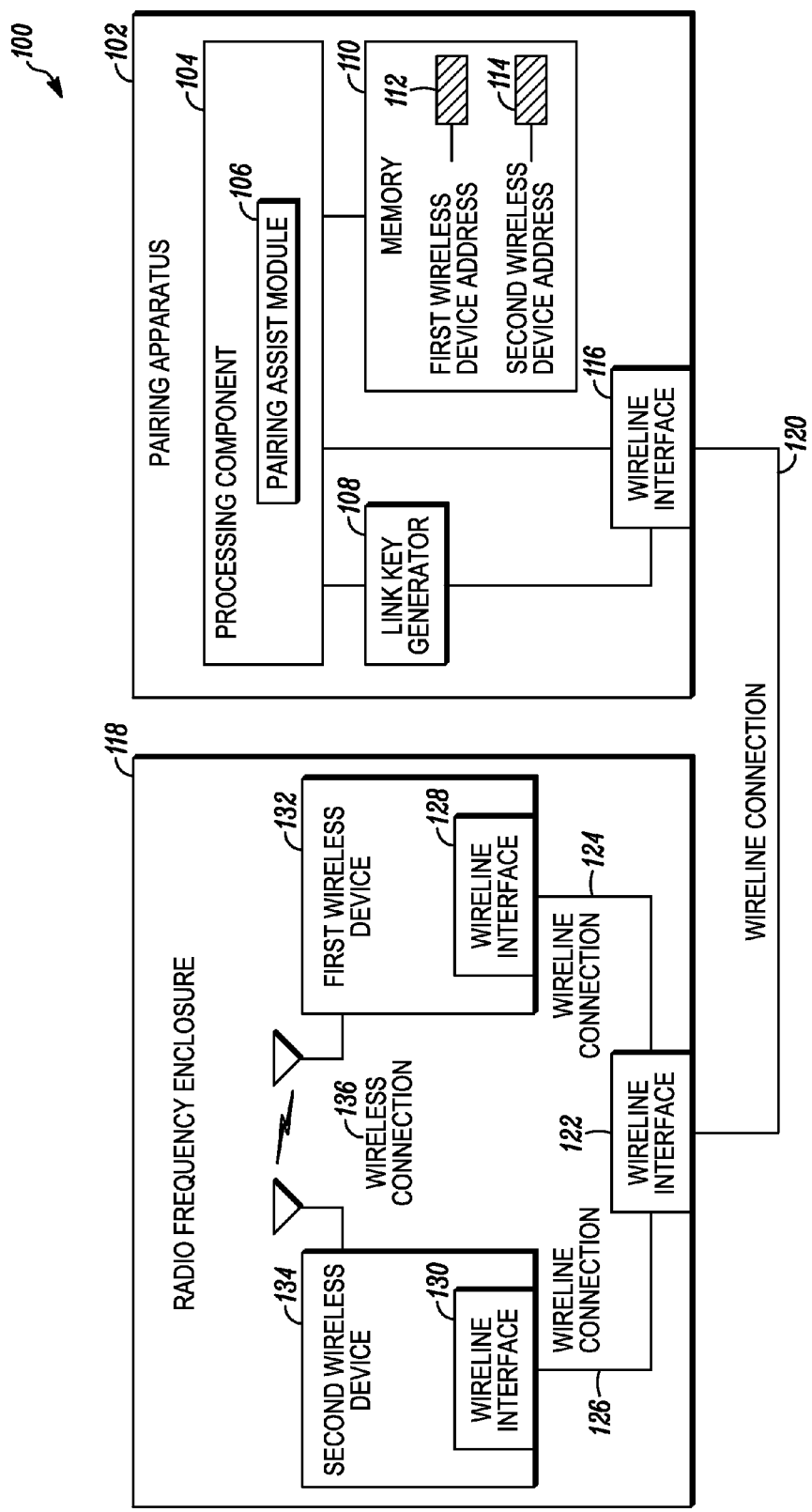
FIG. 1 is a block diagram of a pairing system configured for implementing embodiments in accordance with the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure describes methods and apparatus to facilitate pairing between wireless devices, such as Bluetooth devices, during a pairing process. The embodiments disclosed provide an increased level of security while minimizing the need for user interaction during the pairing process. In accordance with the teachings herein, a method performed by a pairing apparatus to facilitate pairing between a first wireless device and a second wireless device includes determining an address of the second wireless device and writing that address to the first wireless device to bypass an address discovery process between the first and second wireless devices. The method also initiates removal of an input and output capability indication in at least one of the two wireless devices to control an association model type that is applied during a pairing process between the first and second wireless devices, which uses the address of the second wireless device. The removal of the input and output capability indication is reversed upon confirming a successful pairing between the first and second wireless devices.

Also in accordance with the teachings herein is a first wireless device, configured to perform a pairing process with a second wireless device. The first wireless device includes: a memory configured for storing an address of the second wireless device; a radio configured for creating a wireless connection; and a protocol stack coupled to the memory and the radio. The protocol stack includes: a device discovery module, for performing a device discovery process; a wireless connection module, for performing a wireless connection process; and a pairing module, for performing a pairing process that applies an association model type that is selected based on device input and output capabilities. The first wireless device also has: a processing component coupled to the memory, the radio, and the protocol stack. The processing component is configured to execute a pairing assist module. The pairing assist module configures the processing component to: detect the address of the second wireless device stored in the memory; control the protocol stack to bypass the device discovery process; control the protocol stack to perform the wireless connection process for creating the wireless connection to support the pairing process; and control the protocol stack to perform the pairing process using a first association model that is applied when at least one of the first or the second wireless devices indicates no input and output capabilities.

For one embodiment, the protocol stack includes a wireless protocol stack, and the first association model is a Secure Simple Pairing Just Works association model. In another embodiment, the pairing assist module configures the processing component to control the protocol stack to automatically perform the wireless connection process and the pairing process using the first association model in direct response to detecting the address of the second wireless device stored in the memory.

Referring now to the drawings, FIG. 1 shows a pairing system 100 for wireless devices (also referred to herein simply as devices) consistent with some embodiments of the present teachings. The pairing system 100 includes a pairing apparatus 102 and a radio frequency (RF) enclosure 118, which could be included, for instance, within a wireless device manufacturing facility or a distribution center. The pairing system 100 is used to facilitate or assist the progress of a pairing process between a first wireless device 132 and a second wireless device 134 contained within the RF enclosure. This pairing process assist is performed over an out-of-band (OOB) connection (also referred to herein as an OOB link) between the pairing apparatus 102 and one or both of the first and second wireless devices 132, 134.

As used herein, OOB refers to communications, or hardware and software related to communications, either wireline (e.g., 120) or wireless (e.g., 136), that involve a communication protocol other than the primary communication protocol used by the wireless devices 132, 134 for wireless communications. In an embodiment, the OOB connection between the pairing apparatus 102 and the first wireless device 132 includes: a wireline interface 116 of the pairing apparatus 102; a wireline connection 120 between the pairing apparatus 102 and the RF enclosure 118; a wireline interface 122 of the RF enclosure 118; a wireline connection 124 between the RF enclosure 118 and the first wireless device 132; and a wireline interface 128 of the first wireless device. Similarly, the OOB connection between the pairing apparatus 102 and the second wireless device 134 includes: the wireline interface 116; the wireline connection 120; the wireline interface 122; a wireline connection 126 between the RF enclosure 118 and the second wireless device 134; and a wireline interface 130 of the second wireless device 134.

In one example implementation, the wireline interfaces 116, 122, 128, and 130 include standardized Universal Serial Bus (USB) receptacles. Many wireless devices currently incorporate USB Type A, mini-USB, or micro-USB receptacles for charging or data transfer purposes, and these pre-existing receptacles may be used as wireline interfaces 128 and/or 130. The wireline connections 120, 124, and 126 are correspondingly standardized USB connectors, which include suitable cables and plugs. In alternative implementations, different standard or proprietary wireline interfaces 116, 122, 128, 130 and connections 120, 124, 126 including, for instance, Serial Peripheral Interface (SPI) busses are substituted to create the OOB connections between the pairing apparatus 102 and the first 132 and second 134 wireless devices.

The pairing apparatus 102 also includes: a processing component 104, which includes a pairing assist module 106; a link key generator 108; and memory 110, which includes memory locations for a first wireless device address 112 and a second wireless device address 114, all coupled as shown. Additional details are provided below for elements 104-114. The RF enclosure 118 is constructed to contain, hold, or keeps RF transmissions, emanating from the Bluetooth devices 132, 134, to its interior while simultaneously preventing outside RF transmissions from entering the RF enclosure 118. This serves as a security precaution by virtually eliminating eavesdropping and man-in-the-middle attacks from occurring while the wireless devices 132, 134 are being paired within the RF enclosure 118.

Figure 2:
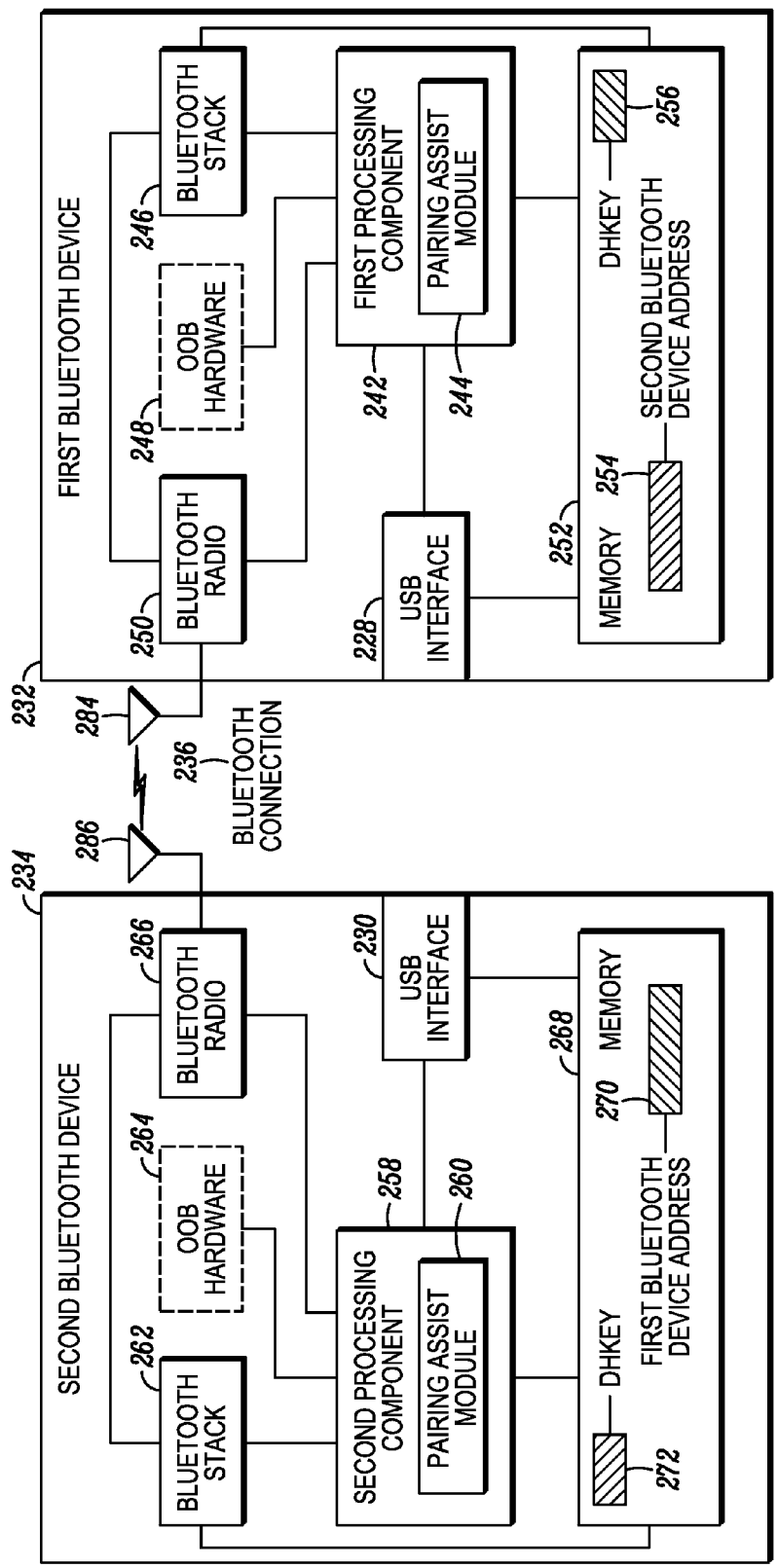
FIG. 2 is a block diagram of Bluetooth devices configured for implementing embodiments in accordance with the present teachings.

Embodiments of the first 132 and second 134 wireless devices within the RF enclosure 118 are shown with greater detail in FIG. 2. In an embodiment, the first wireless device 132 is a first Bluetooth device 232, and the second wireless device 134 is a second Bluetooth device 234. A Bluetooth device, as used herein, is a device that contains hardware and/or software that configures the device to establish and communicate over a Bluetooth connection 236 and in at least some situations to perform standard Bluetooth pairing in accordance with the Bluetooth wireless communication standard. As used herein, the Bluetooth connection 236 is also referred to as a Bluetooth link. The Bluetooth wireless communication standard is defined by the Bluetooth Special Interest Group (SIG) Core Specification version 4.0 dated Jun. 30, 2010, in addition to any previous and subsequent versions. In an alternative embodiment, a different standard or proprietary protocol is used to establish the connection 236 and to perform a "normal" pairing procedure when embodiments of the present disclosure are not implemented to facilitate the pairing process.

Specifically, the first Bluetooth device 232 includes: a first processing component 242 that includes a pairing assist module 244; a Bluetooth stack 246 (also referred to herein as a protocol stack); optional OOB hardware 248; a USB interface 228; a Bluetooth radio 250 (also referred to herein as a radio); memory 252 with memory locations for a second Bluetooth device address 254 and a Diffie-Hellman key (DHKey) 256; and an antenna 284. The protocol stack also includes: a device discovery module, a wireless connection module, and a pairing module, which are not shown. Similarly, the second Bluetooth device 234 includes: a second processing component 258 that includes a pairing assist module 260; a Bluetooth stack 262; optional OOB hardware 264; a USB interface 230; a Bluetooth radio 266; memory 268 with memory locations for a first Bluetooth device address 270 and the DHKey 272; and an antenna 286.

In an embodiment, the elements within each Bluetooth device, 232 and 234, are coupled as shown, with the processing component connected to the USB interface, the Bluetooth stack, the OOB hardware, the Bluetooth radio, and the memory. The Bluetooth stack is additionally connected to the Bluetooth radio and the memory, which, in turn, is also connected to the USB interface. Further, the antenna, which is connected to the Bluetooth radio, is used to establish the Bluetooth connection 236.

FIGS. 1 and 2 show only two wireless devices, and FIG. 1 shows a single pairing apparatus 102 for simplicity in illustrating pairing in accordance with the present teachings. However, multiple such pairing apparatus 102 can be housed within the same facility to assist the pairing process for many more wireless devices. Moreover, other elements needed for a commercial embodiment of the pairing system 100 and the Bluetooth devices 232 and 234 are omitted from FIGS. 1 and 2 for clarity in describing the enclosed embodiments.

We now turn to a brief description of the elements within the system 100 and the devices 232 and 234. In general, where an element is "adapted," "operative" or "configured" for certain functionality, this means that the element at a minimum includes the requisite hardware for performing that functionality. In an embodiment, the element may also be configured using software and/or firmware to perform the functionality. A module refers to an element used to perform a process. In one embodiment, a module is embodied individually in hardware, software, or firmware, or in any combination of hardware, software, and firmware. For example, the pairing apparatus 102; the Bluetooth devices 232 and 234; and the hardware within those devices, e.g., the processing components, 104, 242, 258; memory 110, 252, 268; radios 250, 266; OOB hardware 248, 264; and wireline interfaces 128, 130, are configured to perform functionality in accordance with embodiments of the present disclosure as described in detail below with respect to the remaining FIGS. 3-5. Such functionality is supported by the elements shown in FIGS. 1 and 2, including the link key generator 108; the Bluetooth stacks 246, 262; the pairing assist modules 244, 260; and the antennas 284, 286.

As stated above, the pairing apparatus 102 facilitates pairing between wireless devices, such as the first 232 and second 234 Bluetooth devices. The pairing of two devices, as used herein, refers to the process of establishing a trusted relationship between the devices based on a shared secret. For an embodiment, this shared secret is a link key stored by both devices. The established link key (also referred to herein as an authentication key) is used by each wireless device during communications to authenticate the identity of the other device as being a device to which it had previously paired. The link key is also used to encrypt communications between the devices to prevent eavesdropping. In a particular embodiment, the link key is or is derived from a DHkey generated by the Diffie-Hellman key-exchange algorithm, which is an elliptic curve cryptography mechanism used by Secure Simple Pairing (SSP). In another embodiment, the DHkey is generated by the link key generator 108 within the pairing apparatus 102. In additional embodiments, the link key generator 108 uses algorithms other than the Diffie-Hellman key-exchange algorithm to generate a link key.

The processing components 104, 242, 258 include, for instance, arithmetic logic and control circuitry to facilitate the pairing of the Bluetooth devices 232 and 234. Specifically, the pairing assist modules 106, 244, 260 of the processing components incorporate the processing, e.g., the algorithms, that govern some of the aspects of the described embodiments.

The memories 110, 252, 268 provide temporary storage of electronic data used in and resulting from the processing implemented to facilitate the pairing of the two Bluetooth devices 232 and 234. Additionally, the memory of each Bluetooth device is configured to store the address of the other Bluetooth device, and the memory 110 of the pairing apparatus 102 is configured to store the address of one or both wireless devices being paired. For particular embodiments, the address of each wireless device is a Bluetooth address as specified within the aforementioned Bluetooth standard.

The Bluetooth stacks 246, 262 include hardware, software, and/or firmware used to implement Bluetooth protocols and profiles used by applications for interoperability between wireless devices. The Bluetooth implementation can be a general-purpose implementation or an embedded implementation targeted to a specific device. For a specific embodiment, the Bluetooth stacks 246, 262 are embodied within integrated circuits. In another embodiment, the Bluetooth stacks 246, 262 are logical representations of functionality that resides within the first 242 and/or second 258 processing components. The Bluetooth radios 250, 266 have hardware such as a transceiver, used to send and receive Bluetooth transmissions over the Bluetooth connection 236.

The optional OOB hardware 248 and 264 is used for wireless OOB communications between the Bluetooth devices 232 and 234 to facilitate Bluetooth pairing in accordance with some aspects of the Bluetooth standard. For example, where near field communication (NFC) or WiFi is used for OOB communications between the Bluetooth devices 232, 234, the OOB hardware 248 and 264 includes the hardware, e.g., NFC tags and transponders for NFC communications or transceivers for WiFi communications, to support these wireless standards. In an embodiment, the OOB hardware 248, 264 is used to facilitate a Bluetooth pairing between the devices 232, 234 that is completed outside of the RF enclosure 118 as described below with reference to FIG. 5.

Figure 3:
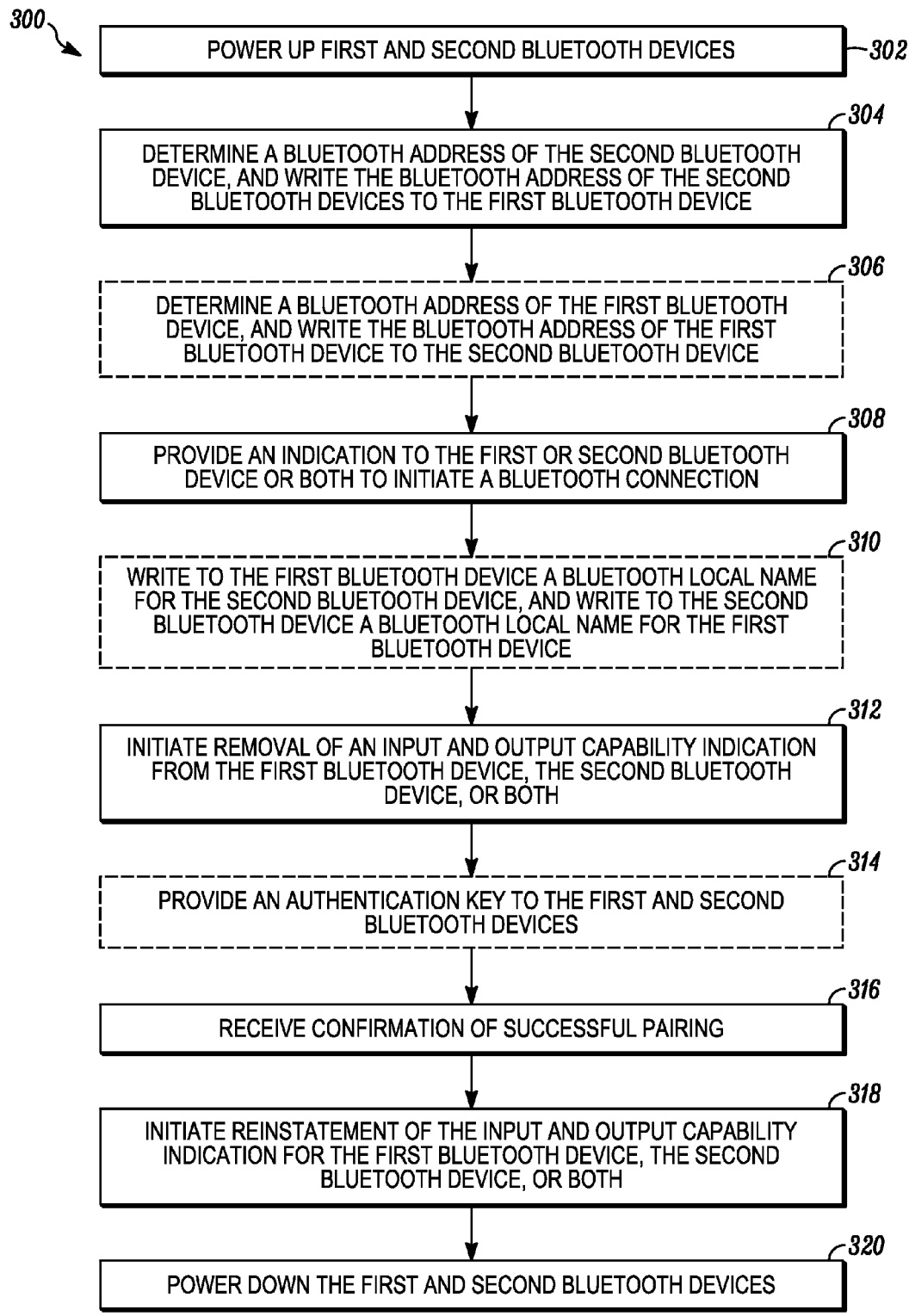
FIG. 3 is a logical flowchart illustrating a method performed by a pairing apparatus for facilitating Bluetooth pairing in accordance with some embodiments of the present teachings.

We turn now to a detailed description of the functionality of the system elements shown at 100 in accordance with the teachings herein and by reference to the remaining figures. In the particular embodiment described, the wireless devices 132, 134 are configured as Bluetooth devices, such as the Bluetooth devices 232, 234 shown in FIG. 2. FIG. 3 is a logical flowchart illustrating a method 300 performed by the pairing apparatus 102 for facilitating the pairing of the Bluetooth devices 232, 234 (e.g., a smartphone and a peripheral device) in accordance with some embodiments of the present teachings.

After being placed into the RF enclosure 118 and the OOB connection is established with the pairing apparatus 102, the Bluetooth devices 232, 234 are powered up 302. For example, the devices 232, 234 are powered on in response to a command or instruction from the pairing apparatus 102. In the alternative, a person such as a technician powers up the devices 232, 234 while placing them into the RF enclosure 118.

Before, after, or during device power up 302, the pairing apparatus 102 determines 304 an address of one of the Bluetooth devices, for instance the second Bluetooth device 234. The address uniquely identifies the Bluetooth transceiver of the second device 234. For the present embodiment, the address may be a Bluetooth device address, specifically, a 48-bit address divided into a 24-bit lower address portion (LAP) field, a 16-bit non-significant address portion (NAP) field, and an 8-bit upper address portion (UAP) field.

For one embodiment, the Bluetooth address of the second device 234 is determined electronically by the pairing apparatus 102 querying the second Bluetooth device 234 via its OOB connection with the device 234. In alternate embodiments, the Bluetooth address of the second device 234 is determined independently of this electronic connection. For instance, the Bluetooth address is read by a scanner (not shown) connected to the pairing apparatus 102 from a barcode (not shown) printed on the outside of the second device 234. For this embodiment, the determination of the Bluetooth address of the second device 234 can be performed prior to powering up the device 234.

Additionally, the pairing apparatus 102 writes 304 the Bluetooth address of the second Bluetooth device 234 to the memory 252 of the first Bluetooth device 232, specifically to the memory location indicated at 254. Optionally, in some embodiments, the pairing apparatus 102 also determines the Bluetooth address of the first Bluetooth device 232 and writes 306 it to the memory location 270 within the memory 268 of the second Bluetooth device 234. For an embodiment, before writing the first and second Bluetooth addresses to the memories of the Bluetooth devices 234, 232, the pairing apparatus 102 first writes the addresses to its own memory 110 at 112 and 114, respectively.

The pairing apparatus 102 provides 308 an indication to the first 232, second 234, or both Bluetooth devices to initiate a Bluetooth connection 236. A Bluetooth connection 236 between the devices 232, 234 means that there is a physical channel open between the devices 232, 234 whereby they can exchange data packets with one another. The connection 236 is used to exchange information, such as information related to the establishment of a link key, that is part of the pairing process.

As an option, the Bluetooth devices 232, 234 are personalized. Personalization involves writing 310 to the first Bluetooth device 232 a Bluetooth local name for the second Bluetooth device 234, and/or writing 310 to the second Bluetooth device 234 a Bluetooth local name for the first Bluetooth device 232. A Bluetooth local name is a character string, for instance customized according to user preference, that functions as a label for a Bluetooth device. This label is provided on a display of another Bluetooth device during discovery and presented by a paired Bluetooth device during normal operation. A cell phone that is paired with a Global Positioning System (GPS) unit for hands-free operation in an automobile, for example, might display the label "Joe's GPS" to a user (presumably Joe) on its display while the label "Joe's Phone" can be displayed on the screen of the GPS unit.

For an embodiment, personalization data is obtained at the time a customer places an order for paired Bluetooth devices and is entered into a computer system that interfaces with the pairing apparatus 102. When the pairing apparatus 102 identifies that the appropriate Bluetooth devices are connected, the personalization data is written to the devices. For a particular embodiment, the local names are written to non-volatile read-only-memory (ROM) elements within the personalized Bluetooth devices.

The pairing apparatus 102 initiates 312 removal of an input and output (I/O) capability indication from the first Bluetooth device 232, the second Bluetooth device 234, or both. In an alternate embodiment, the pairing apparatus 102 initiates 312 removal of the I/O indication before it provides 308 an indication to initiate a Bluetooth connection, but after it writes 304 the second Bluetooth device address to the memory 254 of the first Bluetooth device 232. For a specific embodiment, initiating the removal of the I/O capability from the first Bluetooth device 232 includes sending a first instruction to the first device 232 after writing 304 the address of the second Bluetooth device 234 to the first device 232. In alternate embodiments, writing 304 the second Bluetooth device address to the first Bluetooth device 232 initiates the removal of the I/O capability indication for the first device 232. For one embodiment, this is accomplished by setting a flag within the first device 232. In another embodiment, a software module that establishes the I/O capability indication for the first device is bypassed. Initiating 312 the removal of the I/O capability indication causes performance of a pairing process, between the first 232 and second 234 Bluetooth devices, that does not require user input.

An I/O capability indication, as used herein, is an indication by a device of its I/O capabilities or functionalities. Examples of input capabilities include, but are not limited to: buttons, switches, keyboards, touch screens, track balls, joy sticks, scanners, and microphones. Examples of output capabilities include, but are not limited to: visual displays, braille displays, speakers, printers, and projectors. Which of a plurality of association models is used for the pairing of two Bluetooth devices is deterministic based on the I/O capabilities of the devices being paired. For example, a Bluetooth device may have a screen capable of displaying a six-digit number and a button that allows a user to confirm the number shown is the same as a number displayed on another Bluetooth device. An I/O capability indication that reflects this functionality allows the Bluetooth device to use a Secure Simple Pairing (SSP) Numeric Comparison association model (one of four SSP association models) when pairing with another Bluetooth device having similar I/O capability.

However, initiating the removal of the input and output capability indication causes the application of a SSP Just Works association model during the pairing process. Stated another way, to eliminate user involvement, use of the Just Works association model is forced by initiating 312 removal of the I/O capability indication. More particularly, the Just Works association model is applied in cases where at least one of two Bluetooth devices being paired does not have a display capable of displaying a six-digit number nor does it have a keyboard capable of entering a six-digit number. Pairing a cell phone with a headset is an example scenario where the Just Works association model is used because headsets (at least most) do not have a display or the means to enter a number. The Just Works association model uses the Numeric Comparison protocol but the user is never shown a number. By itself, this association model offers protection against passive eavesdropping but no protection against a man-in-the-middle attack. Performing the pairing process within the RF enclosure 118 of the pairing apparatus 102 nearly eliminates a possibility of a man-in-the-middle attack in this situation.

The pairing apparatus 102 can optionally establish security by providing 314 an authentication key (a DHKey for the present embodiment) to the first 232 and second 234 Bluetooth devices. As an alternative way to provide an authentication key, the devices 232, 234 can create and exchange a DHKey directly with one another by using the Bluetooth connection 236 established at 308. Where the pairing apparatus 102 is the source of the DHKey, the link key generator 108 can establish the DHKey. In this example, the authentication key is created by the pairing apparatus 102. In another embodiment, the pairing apparatus forwards the authentication key from another device. For example, the first 232 and second 234 Bluetooth devices can pass the DHKey through the pairing apparatus, which acts as an intermediary, using the OOB connection 120.

Continuing the example, the pairing apparatus 102, after initiating removal of the I/O capability indication, initiates a wireless connection 236 between the first 232 and second 234 Bluetooth devices to support the pairing process. For an embodiment where the wireless connection 236 constitutes a link that is OOB to a Bluetooth link, at least a part of the pairing process is performed over the OOB link by providing an authentication key to the first 232 and second 234 Bluetooth devices using the OOB link.

After the link key is exchanged and the Just Works association is completed, the pairing apparatus 102 receives 316 confirmation of successful pairing from the Bluetooth devices 232, 234. The first Bluetooth device 232 confirms successful pairing, for example, by sending a random number challenge to the second Bluetooth device 234 and receiving the proper response. Upon confirming the successful pairing, the pairing apparatus reinstates 318 the input and output capability indication for the first Bluetooth device, the second Bluetooth device, or both. For a specific embodiment, reinstating 318 the input and output capability indication for the first Bluetooth device 232 includes sending an instruction to the first Bluetooth device 232 to reverse the removal 312 of the I/O capability indication. This allows the paired devices to operate normally with the indication of their full I/O capabilities restored.

The pairing apparatus 102 powers down 320 the first 232 and second 234 Bluetooth devices by sending a power-down command via the OOB connection 120. The devices 232, 234 are then removed from the RF enclosure 118 and can be packaged together for sale as a set of securely paired devices.

Figure 4:
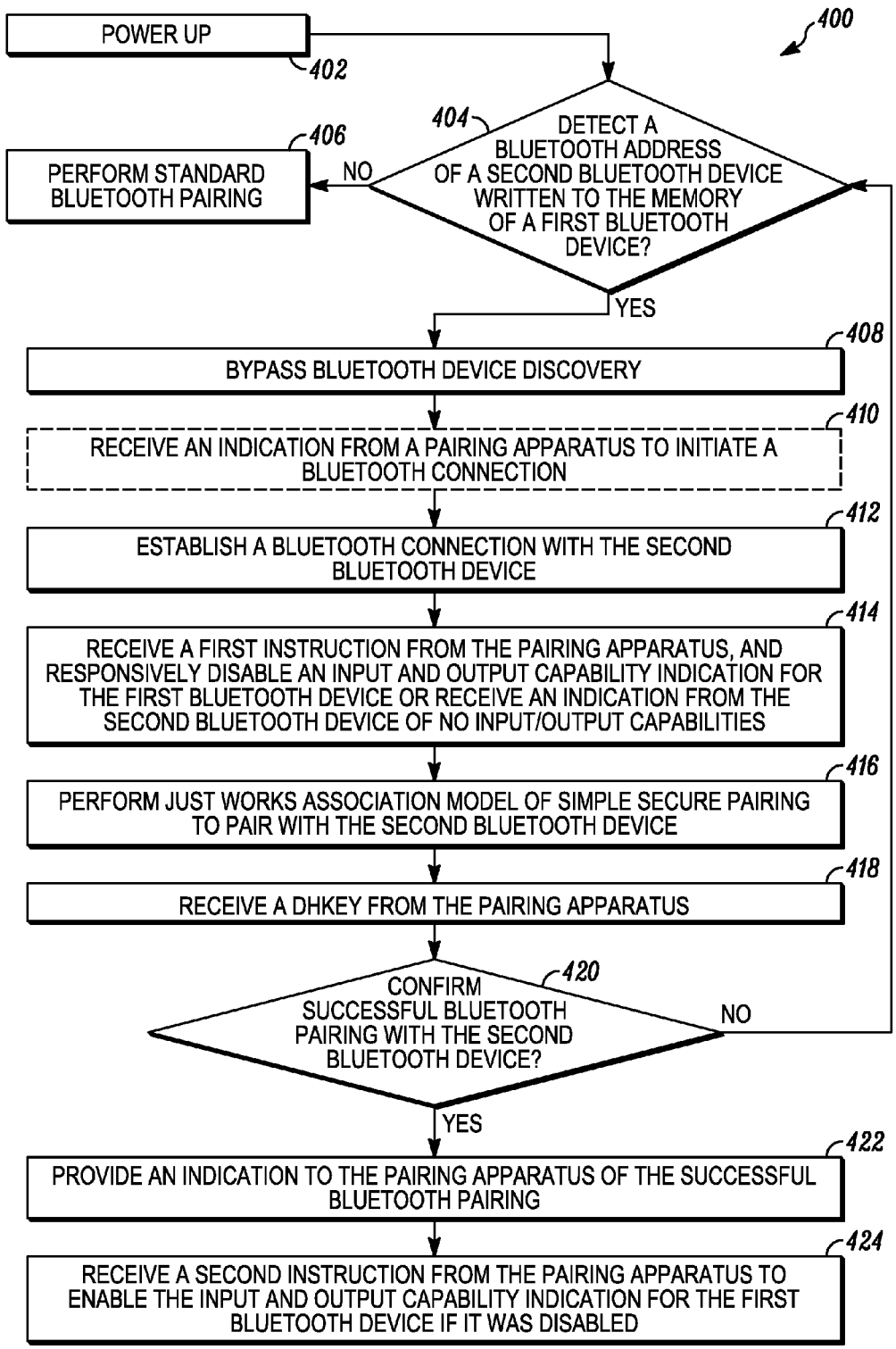
FIG. 4 is a logical flowchart illustrating a method performed by a Bluetooth device for Bluetooth pairing in accordance with some embodiments of the present teachings.

FIG. 4 is a logical flowchart illustrating a method 400 for Bluetooth pairing performed by the first Bluetooth device 232, for example, in accordance with some embodiments of the present teachings. In particular, the method 400 incorporates a mechanism for OOB authentication, and begins with powering up 402 the first Bluetooth device 232 after placing it (along with the second Bluetooth device 234) in the RF enclosure 118 and connecting it to the pairing apparatus 102.

The first Bluetooth device 232 determines 404 whether a second Bluetooth device address has been written to its memory 252 at the location 254 (e.g., by the pairing apparatus at 304). If no address is detected at the location 254, the first Bluetooth device 232 performs 406 standard Bluetooth pairing, which includes device discovery. Device discovery involves the first device 232 transmitting a discovery request and performing a scanning procedure to locate and query other discoverable Bluetooth devices that transmit a response.

If the first Bluetooth device 232 detects 404 a second Bluetooth device address in its memory 252, the first device 232 bypasses 408 normal Bluetooth discovery. The first Bluetooth device 232 establishes 412 a Bluetooth connection 236 with the second Bluetooth device 234. In one embodiment, the first device 232 establishes 412 the Bluetooth connection 236 in response to an indication received 410 from the pairing apparatus 102 (e.g., the indication sent at 308). In another embodiment, the first device 232 initiates the Bluetooth connection 236 in response to detecting 404 the second Bluetooth address.

In an embodiment, the first Bluetooth device 232 receives 414 a first instruction from the pairing apparatus 102 (e.g., an instruction sent at 312) and responsively disables an I/O capability indication for the first device 232. More particularly, the pairing assist module 244 configures the first processing component 242 to change the indication of I/O capabilities for the first Bluetooth device 232 from a first set of I/O capabilities to no I/O capabilities, in response to receiving the first instruction. Alternatively, the first device 232 receives an indication from the second Bluetooth device 234 of no I/O capabilities. As a first alternative, the second device 234 sends the indication of no I/O capabilities to the first device 232 in response to the second device 234 receiving an instruction from the pairing apparatus 102 (e.g., an instruction sent at 312). As a second alternative, the second device 234 sends the indication of no I/O capabilities to the first device 232 as a consequence of the second device 234 not having any I/O capabilities.

As a result of an indication of no I/O capability for at least one device, the first Bluetooth device 232 uses the SSP Just Works association model to pair 416 with the second Bluetooth device 234. More particularly, the pairing assist module 244 configures the processing component 242 of the first Bluetooth device 232 to control the Bluetooth stack 246 to perform the pairing using the SSP Just Works association model. For embodiments represented by the method 400, the first Bluetooth device 232 receives 418 a DHKey from the pairing apparatus 102. In a first embodiment, the link key generator 108 within the pairing apparatus 102 generates the DHKey. In a second embodiment, the pairing apparatus 102 and its OOB connection with the first 232 and second 234 devices simply serves as a conduit for the link key to pass through from the second Bluetooth device 234. For an alternate embodiment, a DHKey created by the first 232 and/or second 234 device is exchanged over the Bluetooth connection 236, which leaves no record of the key with the pairing apparatus 102. The pairing assist module 244 configures the processing component 242 of the first Bluetooth device 232 to write the received authentication key to its memory 252 at the location indicated at 256.

The first Bluetooth device 232 verifies 420 successful pairing with the second Bluetooth device 234. If successful pairing cannot be confirmed, the first device 232 returns to detecting 404 a Bluetooth address of a second Bluetooth device by again checking its memory 252. If successful pairing is confirmed, the first Bluetooth device 232 provides 422 a successful-pairing indication to the pairing apparatus 102. In return, the first Bluetooth device 232 receives 424 a second instruction from the pairing apparatus 102 (e.g., an instruction sent at 318) to enable the I/O capability indication for the first device 232 if it was previously disabled 414. More particularly, the pairing assist module 244 configures the processing component 242 to send to the pairing apparatus 102 the indication of the successful pairing to trigger the sending of the second instruction. The term "trigger," as used herein, refers to an event or condition that causes or precipitates another event. The pairing assist module 244 configures the first processing component 242 to change the indication of I/O capabilities for the first Bluetooth device 232 back to the set of programmed I/O capabilities, in response to receiving the second instruction. For an embodiment, the first Bluetooth device 232 also powers down (not shown) in response to an instruction (e.g., an instruction sent at 320) received from the pairing apparatus 102.

Figure 5:
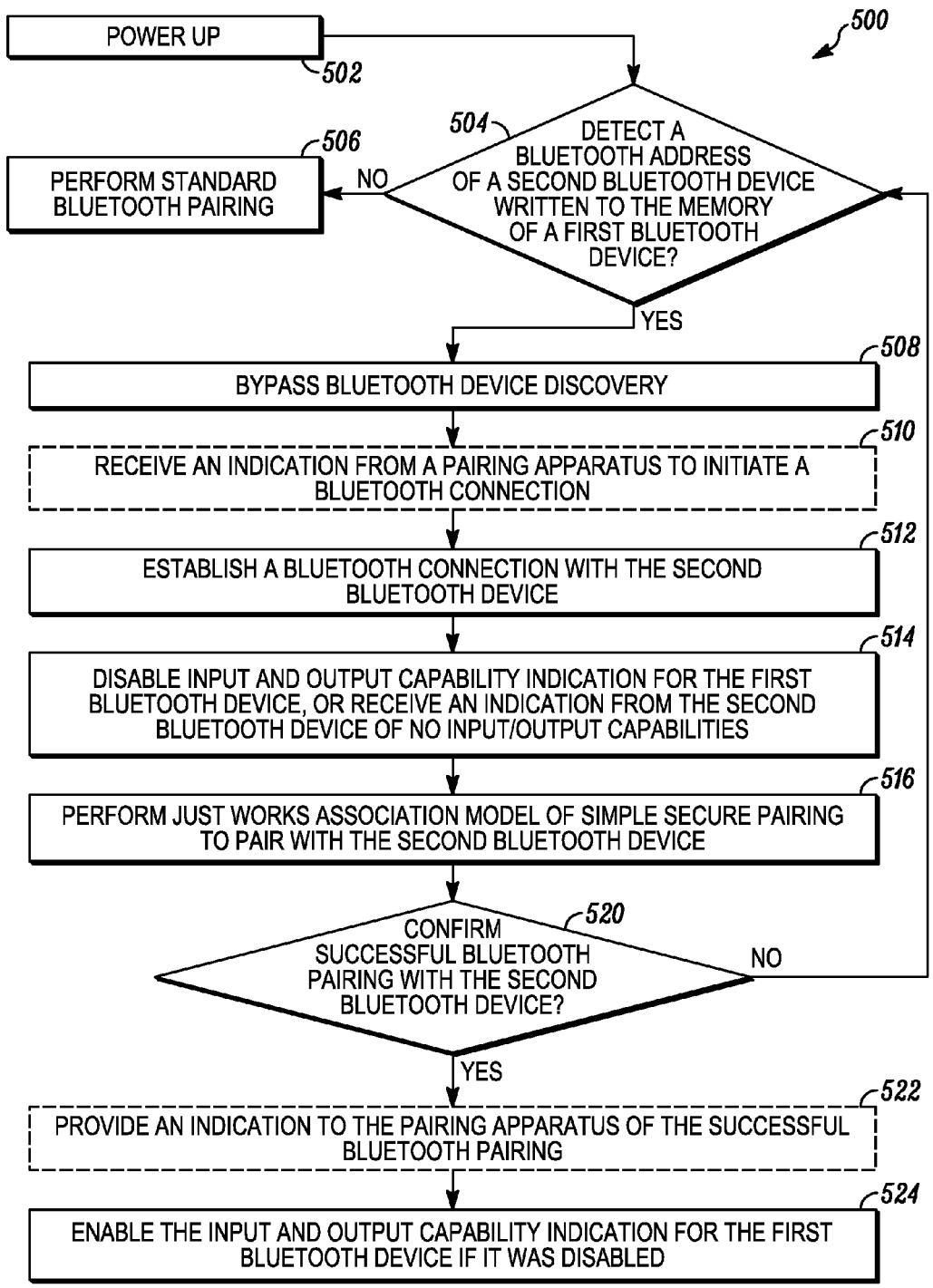
FIG. 5 is a logical flowchart illustrating a method performed by a Bluetooth device for Bluetooth pairing in accordance with some embodiments of the present teachings.

Another logical flowchart illustrating a method 500 for Bluetooth pairing performed by the first Bluetooth device 232 in accordance with some embodiments of the present teachings is shown in FIG. 5. In contrast to the method 400, the method 500 provides a mechanism for in-band authentication and does not presume a pairing apparatus connection. The initial actions performed by the first Bluetooth device 232 at 502, 504, 506, 508, 510, 512 proceed as previously described in FIG. 4 at 402, 404, 406, 408, 410, 412, respectively.

The first Bluetooth device 232 (specifically, its pairing assist module 244) disables 514 the I/O capability indication for the first device 232 in response to the first device 232 detecting 504 the second Bluetooth device address. Alternatively, the first Bluetooth device 232 receives an indication from the second Bluetooth device 234 of no I/O capability. With an indication of no I/O capability for at least one device, the first Bluetooth device 232 pairs 516 with the second Bluetooth device 234 using the SSP Just Works association model.

For the method 500, the Bluetooth devices 232, 234 perform authentication in-band so that the DHKey is shared between them using the Bluetooth connection 236. Confirmation 520 of successful pairing proceeds as it did at 420 for the method 400. Upon confirmation of successful pairing, however, it is the pairing assist module 244 that configures the first processing element 242 to enable 524 the I/O capability indication for the first Bluetooth device 232 if it was previously disabled 514. For a particular embodiment, the first Bluetooth device 232 also provides 522 an indication of successful pairing to the pairing apparatus 102. With successful pairing complete, the first 232 and second 234 Bluetooth devices are ready for powering down and removal from the RF enclosure 118.

For a different embodiment, the first Bluetooth device 232 performs the method 500 after it and second Bluetooth device 234 are disconnected from the pairing apparatus 102 and removed from the RF enclosure 118. While the devices 232, 234 are connected to the pairing apparatus 102, the pairing apparatus 102 writes the Bluetooth address of the second device 234 to the memory 252 of the first device 232. In an embodiment where the second Bluetooth address is indicated externally on the second Bluetooth device 234 (such as with a barcode), the second Bluetooth device 234 does not need to be powered up to obtain the second Bluetooth address. In an alternate embodiment, both devices 232, 234 are powered up and the pairing apparatus 102 reads the Bluetooth address of each device and writes it to the memory of the other device. After a Bluetooth address is written to one or both devices, any powered up device is powered down, and the devices 232, 234 are packaged and sold to a consumer/user as a set.

When the user first powers up the devices 232, 234, they automatically pair without user input using method 500. This is accomplished by the pairing assist module 244 configuring the first processing component 242 of the first Bluetooth device 232 to perform the method 500 independently of the pairing apparatus 102. The optional actions indicated at 510 and 522 that involve the pairing apparatus 102 are not performed. As the first Bluetooth device 232 powers up, it detects the second Bluetooth address in its memory 252 at 504. This serves as the trigger for the first device 232 to complete the pairing process by taking the actions specified at 508, 512, 514, 516, 520, and 524.

This embodiment where the first device 232 performs the method 500 independently of the pairing apparatus 102 provides greater protection against a man-in-the-middle attack than the standard method for Bluetooth pairing because the first device 232 bypasses 508 the discovery mechanism. There is a much higher burden for a man-in-the-middle device to reproduce and synch with the Bluetooth clock of the paging device without already knowing its Bluetooth address.

Specifically, the first Bluetooth device 232 disables 514 its I/O capability indication so that the SSP Just Works association model is used. In an alternate embodiment, the pairing apparatus 102 disables the I/O capability indication of the second Bluetooth device 234 when it writes the second Bluetooth address to the memory of the first device 232. The first device 232 enables 524 the I/O capability indication to again reflect its actual I/O capabilities when successful pairing 522 with the second device 234 is completed.

In a separate embodiment, where a first Bluetooth address is written to the memory of the second Bluetooth device 234, the second Bluetooth device 234 can initiate the pairing by performing actions analogous to those specified at 504, 508, 512, 514, 516, 520, and 524. In a particular embodiment, if the first Bluetooth device 232 is out of range or powered down when the user first powers up the second device 234, the second Bluetooth device 234 remains ready to perform the pairing process so that the pairing completes as described above when both devices are powered up and within range of one another.

For a particular embodiment, the Bluetooth devices 232, 234 also establish an NFC wireless connection between them, at 512, for example, using the OOB hardware 248, 264. The Bluetooth devices 232, 234 use the NFC wireless connection to exchange security information, such as Bluetooth security information. The benefit of this is that it provides additional security when the pairing process is completed outside of the RF enclosure 118. Using NFC transmissions to exchange security information reduces the likelihood of third-party interception because NFC has a lesser effective range as compared to Bluetooth. After establishing security using the OOB association model, the first Bluetooth device 232 goes on to confirm 520 successful pairing and enable 524 the I/O capability indication if it was disabled at 514.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing components") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a pairing apparatus to facilitate pairing between a first wireless device and a second wireless device, the method comprising:
   determining an address of the second wireless device;
   writing the address of the second wireless device to the first wireless device to bypass an address discovery process between the first wireless device and the second wireless device;
   after writing the address of the second wireless device to the first wireless device, sending, by the pairing apparatus and to at least one of the first wireless device or the second wireless device, a first instruction to initiate a removal of an input and output capability indication in the at least one of the first wireless device or the second wireless device, wherein the removal of the input and output capability indication causes a selection of an association model type that is applied during a pairing process between the first wireless device and the second wireless device, wherein the pairing process does not require user input, and wherein the at least one of the first wireless device or the second wireless device disables the input and output capability indication responsive to receiving the first instruction from the pairing apparatus;
   after receiving, by the pairing apparatus, an indication of a successful pairing between the first wireless device and the second wireless device, sending, by the pairing apparatus and to the at least one of the first wireless device or the second wireless device, a second instruction to reverse the removal of the input and output capability indication in the at least one of the first wireless device or the second wireless device.

2. The method of claim 1, further comprising:
   initiating a wireless connection between the first wireless device and the second wireless device to support the pairing process after the removal of the input and output capability indication.

3. The method of claim 1, wherein the writing the address comprises:
   writing a Bluetooth device address of the second wireless device.

4. The method of claim 3, wherein the removal of the input and output capability indication causes a selection of a Secure Simple Pairing Just Works association model that is applied during the pairing process.

5. The method of claim 1, wherein at least a part of the pairing process is performed over a link that is out-of-band to a Bluetooth link, the method further comprising:
   providing an authentication key to the first wireless device and the second wireless device using the link that is out-of-band to the Bluetooth link.

6. The method of claim 5, wherein the authentication key is received from the pairing apparatus.

7. The method of claim 1, further comprising:
   writing to the first wireless device a Bluetooth local name for the second wireless device.

8. The method of claim 1, wherein the pairing process is performed within a radio frequency enclosure coupled to the pairing apparatus.

* * * * *